(12) United States Patent
Kaikumaa

(10) Patent No.: US 9,619,414 B2
(45) Date of Patent: *Apr. 11, 2017

(54) SYSTEM AND METHOD FOR ENABLING THE FAST EXTRACTION OF INTERLEAVED IMAGE DATA

(71) Applicant: Core Wireless Licensing S.A.R.L., Luxembourg (LU)

(72) Inventor: Timo Kaikumaa, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,311

(22) Filed: Mar. 19, 2015

(65) Prior Publication Data

US 2015/0193363 A1    Jul. 9, 2015

Related U.S. Application Data

(63) Continuation of application No. 11/375,069, filed on Mar. 14, 2006, now Pat. No. 9,007,646.

(51) Int. Cl.
*G06K 15/00* (2006.01)
*H04N 5/225* (2006.01)
*G06F 13/28* (2006.01)
*H04N 5/232* (2006.01)

(52) U.S. Cl.
CPC .......... *G06F 13/28* (2013.01); *H04N 5/2257* (2013.01); *H04N 5/23293* (2013.01)

(58) Field of Classification Search
None
See application file for complete search history.

(56) References Cited

U.S. PATENT DOCUMENTS

| 9,007,646 B2 * | 4/2015 | Kaikumaa | G06F 13/28 358/1.16 |
| 2003/0093591 A1 * | 5/2003 | Hohl | G06F 3/14 710/22 |
| 2003/0222998 A1 * | 12/2003 | Yamauchi | G06T 3/4015 348/262 |

* cited by examiner

*Primary Examiner* — Marivelisse Santiago Cordero
*Assistant Examiner* — Neil R McLean
(74) *Attorney, Agent, or Firm* — Borden Ladner Gervais LLP; Gail C. Silver

(57) ABSTRACT

An improved system and method for deinterleaving a data unit containing chunks of two or more different data types. In an embodiment of the invention, both a device MPU and DMA hardware are used to deinterleave a data unit containing chunks of both compressed data and uncompressed data. The device MPU is used to transfer compressed data from an interleaved data buffer to a compressed data buffer, while the DMA hardware is used to transfer uncompressed data from the interleaved data buffer to a compressed data buffer. By using both the MPU and the DMA hardware, the overall efficiency of the data transfer process is improved.

12 Claims, 6 Drawing Sheets

SYSTEM AND METHOD FOR ENABLING THE FAST EXTRACTION OF INTERLEAVED IMAGE DATA

CROSS-REFERENCE TO RELATED APPLICATIONS

This application is a continuation of U.S. patent application Ser. No. 11/375,069, filed on Mar. 14, 2006. U.S. patent application Ser. No. 11/375,069 is incorporated herein by reference.

FIELD OF THE INVENTION

The present invention relates generally to the processing of data in electronic devices. More particularly, the present invention relates to the deinterleaving of different types of data in mobile electronic devices such as mobile telephones with built-in camera modules.

BACKGROUND OF THE INVENTION

In recent years, mobile telephones have increasingly become equipped with built-in camera modules. These camera modules enable a user to take a digital photograph and quickly transmit it to friends and family.

A generic digital camera system that is part of a mobile telephone or other electronic device is shown at 10 in FIG. 1. The digital camera 10 includes a housing 11 which contains at least one lens 12 and at least one image sensor 18 which is operatively connected to a memory unit 14 and a processor or controller 16, both of which are located outside of the camera module 10 and inside of the mobile telephone or other electronic device within which the camera module 10 is housed. The memory unit 14 can be used to store digital images and computer software for performing various functions in the digital camera 10, as well as to implement the present invention. The image sensor 18 can be a charge coupled device (CCD), a complementary metal oxide semiconductor (CMOS), or another system.

Camera modules that are used in mobile telephones are commonly designed to be both small and inexpensive for many reasons. As a consequence of this fact, a typical image sensor 18 does not include any frame memory within the camera module 10. Instead, the image data from a captured image must be output to the telephone engine as soon as it is read from the sensor. Otherwise, the image data would be lost. The image sensor 18 is typically read in a line- by-line fashion, and the data is sent in the same order to the telephone engine, where there exists sufficient memory for storing the data.

In order to reduce the bandwidth needed for transmission of the image data between the camera module 10 and telephone engine, the image sensor 18 often compresses the data before sending it any further. In order to reduce the processing requirements in the telephone engine, many camera modules use JPEG compression at this stage, as the images would likely end up in a JPEG format in any case so that the telephone engine does not need to consume additional time for JPEG encoding.

From a usability perspective, it is not sufficient for the camera images to only be processed and saved to memory. This is because the end-user would also like to view the image he or she has just taken on the screen of the telephone, for example, to decide whether or not the image was of a satisfactory quality. It is also desirable from the user's perspective for there not be any additional delay in showing the preview image to the user.

Unfortunately, however, making a preview image out of the compressed data is not an immediate operation, but instead inevitably takes some additional time. There are a number of different potential solutions to this issue, but each possesses serious drawbacks of its own. One such solution involves allowing the camera module 10 to output the data of the captured image in such a format to allow the quick construction of the smaller preview image that is to be shown on the telephone display. In practice, this means using an uncompressed format for the image data. The problem in this approach, however, is that with higher resolution cameras, there might not be enough bandwidth to transfer the data.

Another potential solution to this problem is to use a camera module that includes sufficient frame memory to permit the same image to be transmitted twice, first as an image with proper size for the display, and then a full resolution image for saving purposes. The problem with this approach is that additional memory is simply too expensive to practically implement this solution.

Another potential solution to the problem discussed above involves interleaving a compressed image for saving and an uncompressed preview image for viewing. Even though there is no memory for a whole image frame in the camera module, a JPEG encoder in the camera requires that there be memory for 8 lines of the image. This makes it possible to interleave the uncompressed preview image data within the compressed full resolution image data. Because the preview data is intended for the mobile telephone's display (whose resolution is substantially lower than the one of the camera sensors), the interleaving of the downscaled preview image does not increase the bandwidth requirements by a large amount. The process of interleaving, where two types of data are split into chunks and sent one after another, is depicted in FIG. 2. In FIG. 2, the white and black diamonds represent specific markers that mark the beginning of each type of chunk. In practice, the markers must be chosen so that they cannot appear in the data itself. Alternatively, one could include information about the length of the chunk into each marker. However, in JPEG encoding, for example, it is generally not possible to know the size of the output data before the encoding has taken place. The camera should therefore be equipped with additional buffers for this approach.

Transmitting all of the data of one image frame requires the transmission of several chunks of preview data and compressed data. One chunk can contain as much information as the camera module is able to buffer at any given time. For example, if a JPEG encoder requires that 8 lines must be available in a buffer of some sort, then it is possible to use chunks that contain data at least for those 8 lines. It should be noted that there might be some additional buffering capability as well in the camera module.

FIG. 2 also illustrates how chunks of preview image data always have the same length, while the length of compressed data chunks may vary. This is because the compression efficiency depends upon the image content and can vary even within one single image. The preview data, on the other hand, is uncompressed and there is therefore always the same amount of preview data to be sent in one chunk. For this reason, the markers after the preview data chunks (at the beginning of the compressed data chunks) are not obligatory, as it is the length of the preview data chunk is always known.

Although the interleaving of compressed and uncompressed data addresses many of the issues that arise in the other potential solutions discussed previously, it still has a significant deficiency. With this approach, even though compressed data is available for storing purposes and preview data available for displaying purposes, the interleaved data must first be deinterleaved before it can be used. In other words, the compressed data must be extracted from the preview data, or the preview data must be extracted from compressed data, before the compressed data can be saved and the preview data can be viewed.

In most conventional mobile telephones with a built-in camera module, once all of the image data has been received into a memory inside the telephone engine, it is processed or copied further by the phone processor in such a way that all of the data contained within the image is addressed in turn. In the case of interleaved data, the data is copied into one of the two buffers upon processing. One buffer is dedicated for storing the preview (uncompressed) data, and the other buffer is dedicated for storing the compressed data. It should be noted that in practice, one of these two buffers may be the same as the original buffer, in case the original interleaved data is no longer needed but can be overwritten. However, this process takes consumes both time and processing power.

It would therefore be desirable to develop a system that enables the more rapid and efficient transmission and availability of both compressed and uncompressed image data in a mobile telephone or other electronic device.

SUMMARY OF THE INVENTION

The present invention report provides a system and method for efficiently deinterleaving interleaved data by using a combination of a micro processor unit (MPU) and direct memory access (DMA) hardware. Because both the MPU and DMA hardware are used for processing the data at the same time, the overall processing time may be decreased significantly depending upon the relative lengths of the chunks of the compressed data and the preview data.

The present invention provides for a number of advantages over conventional systems. With the present invention, the MPU does not need to process the preview data at all; it can skip all of the preview data chunks whose size is known beforehand. As a result, the MPU has more time to perform other functions in the system. In addition, because the DMA hardware and MPU both process data at the same time, deinterleaving finishes much more quickly than in the traditional MPU-only solution. Still further, once the DMA hardware is properly configured, there is little need for additional configurations during the operation. In an optimal situation—depending upon the DMA hardware—one only needs to indicate the new read address and reenable the transfer of data. The present invention can be used in conjunction with a wide variety of types of interleaved data, where of one type have fixed length, and is not only limited to image data.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

The present invention provides for a system of deinterleaving interleaved compressed and uncompressed image data by using a combination of MPU and DMA processing capability. As the MPU and DMA hardware process the data at the same time, the overall processing time may decreased by fifty percent or more depending upon the relative lengths of the chunks of the compressed data and the preview data.

Figure 1:
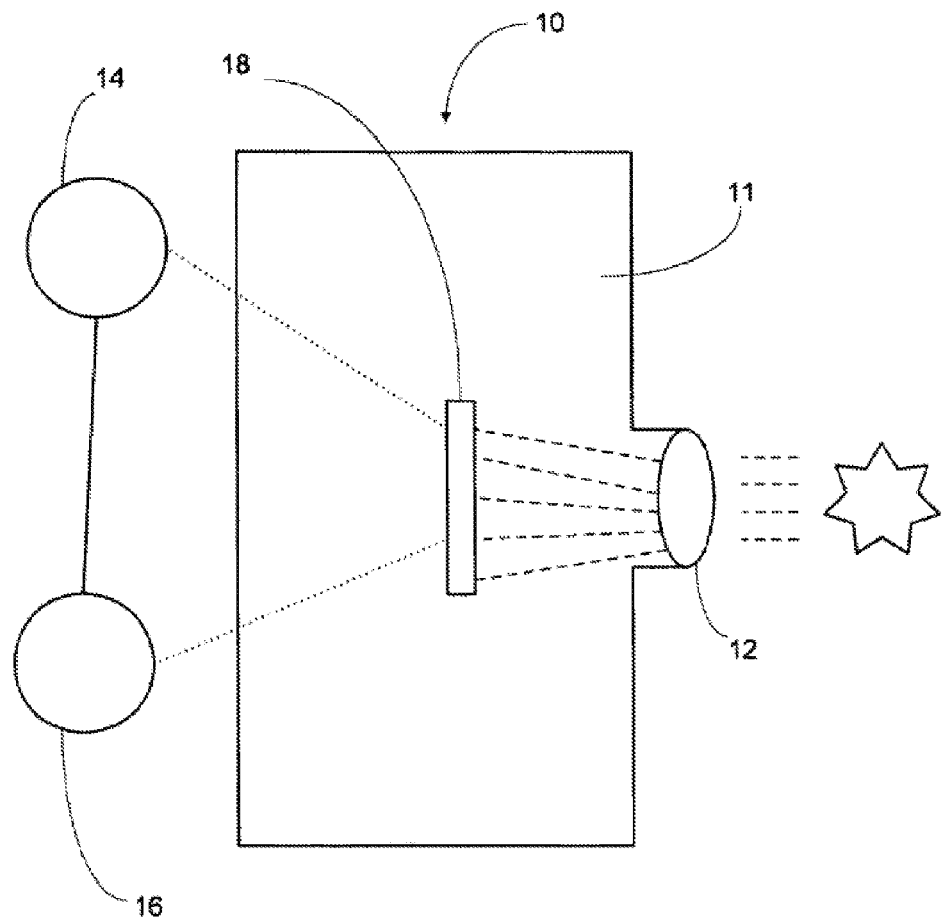
FIG. 1 is a sectional side view of a generic digital camera system.
Figure 2:
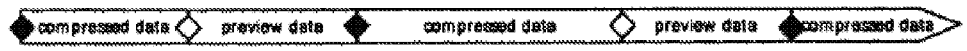
FIG. 2 is a representation showing how both compressed data and uncompressed image preview data can be interleaved for transfer from an image sensor to a telephone engine.
Figure 3:
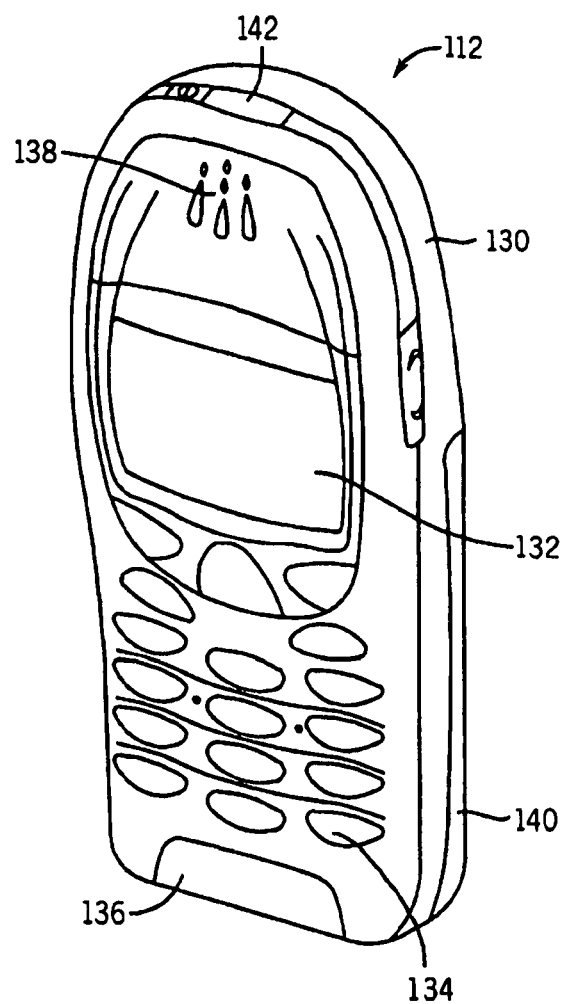
FIG. 3 is a perspective view of an electronic device that can incorporate the principles of the present invention.
Figure 4:
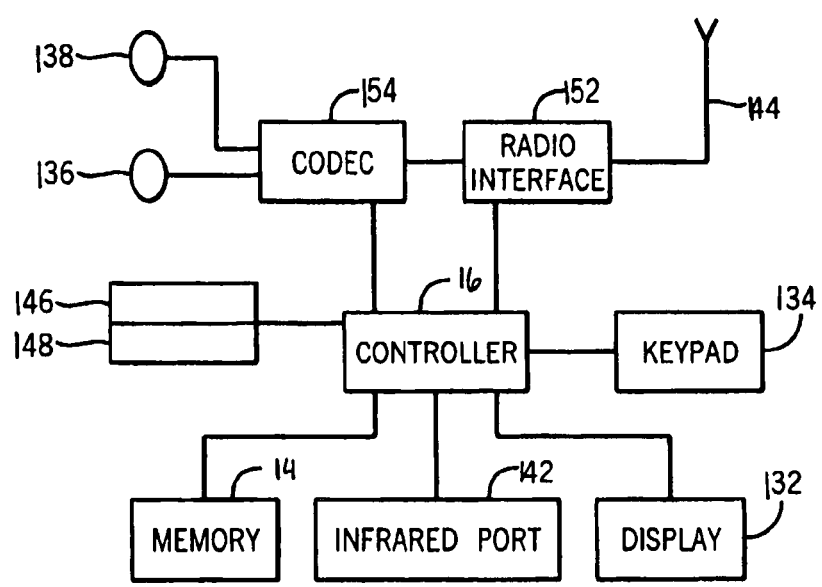
FIG. 4 is a schematic representation of the circuitry of the electronic device of FIG. 3.

FIGS. 3 and 4 show one representative mobile telephone 112 upon which the present invention may be implemented. However, it is important to note that the present invention is not limited to any type of electronic device and could be incorporated into devices such as personal digital assistants, personal computers, and other devices. It should be understood that the present invention could be incorporated on a wide variety of mobile telephones 112. The mobile telephone 112 of FIGS. 2 and 3 includes a housing 130, a display 132 in the form of a liquid crystal display, a keypad 134, a microphone 136, an ear-piece 138, a battery 140, an infrared port 142, an antenna 144, a smart card 146 in the form of a universal integrated circuit card (UICC) according to one embodiment of the invention, a card reader 148, radio interface circuitry 152, codec circuitry 154, the controller 16 and the memory unit 14. Individual circuits and elements are all of a type well known in the art, for example in the Nokia range of mobile telephones.

Figure 5:
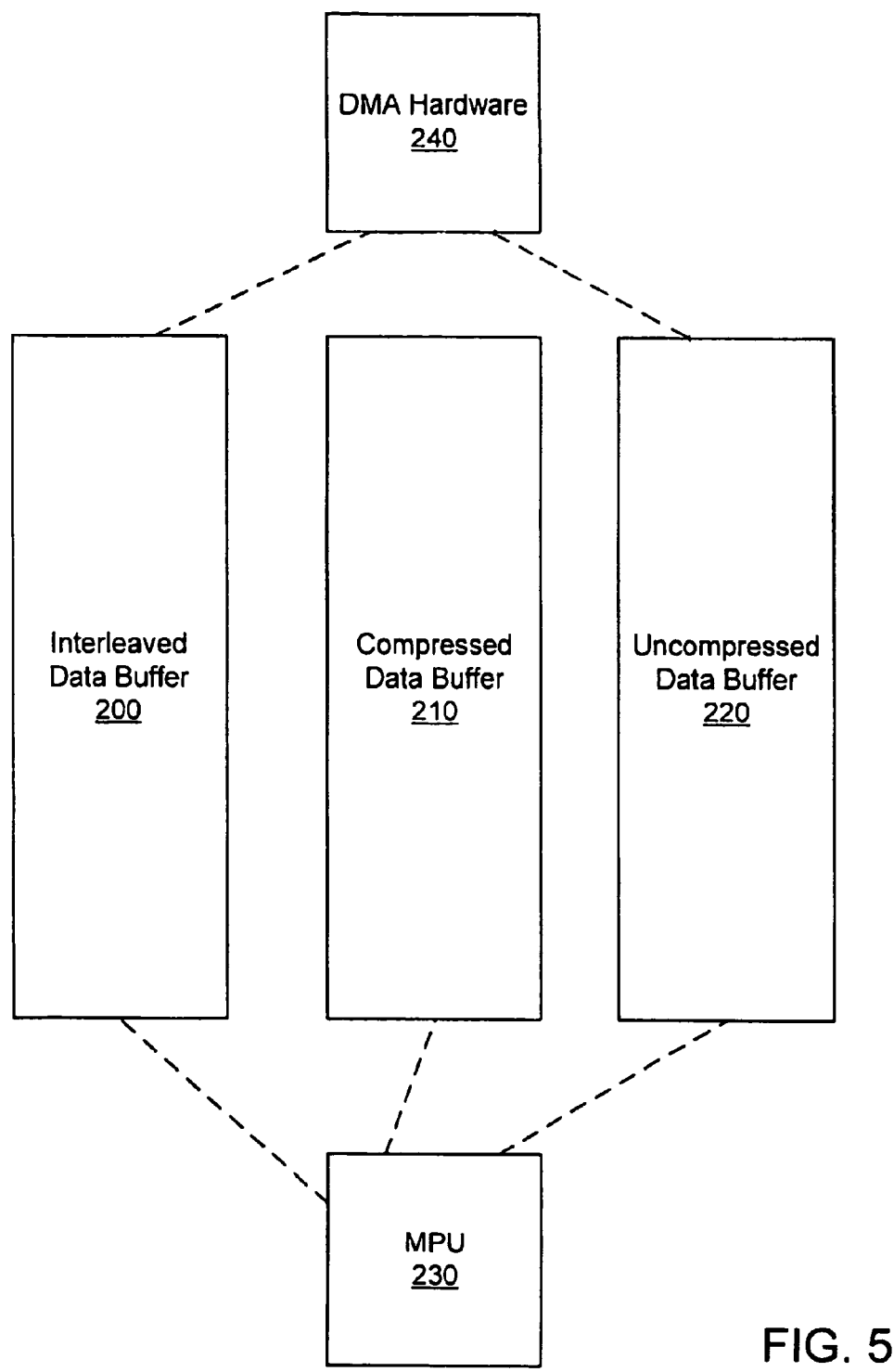
FIG. 5 is a representation of the various components involved in the implementation of one embodiment of the present invention.

FIG. 5 is a representation of the various components involved in the implementation of one embodiment of the present invention. FIG. 5 shows an interleaved data buffer 200, a compressed data buffer 210, and an uncompressed data buffer 220. It should be noted that either the compressed data buffer 210 or the uncompressed data buffer 220 may use the same memory area as the interleaved data buffer 200 if the original data is no longer needed after transmission and can be overwritten. Each of the interleaved data buffer 200, the compressed data buffer 210 and the uncompressed data buffer 220 can be included in the memory unit 14 of the electronic device shown in FIGS. 3 and 4. The system also includes a MPU 230 and DMA hardware 240. The MPU 230, which can comprise the controller 16 of the system shown in FIG. 4, is used to execute the system software, as well as carry out the operations specified by the system software. The DMA hardware 240 is a hardware controller that is capable of moving data from one place in the memory to another place in the memory independent from the MPU 230. It should be noted that the MPU 230, the DMA hardware 240 and the memory unit 14 can comprise separate components, or they can be combined into a single integrated circuit.

Figure 6:
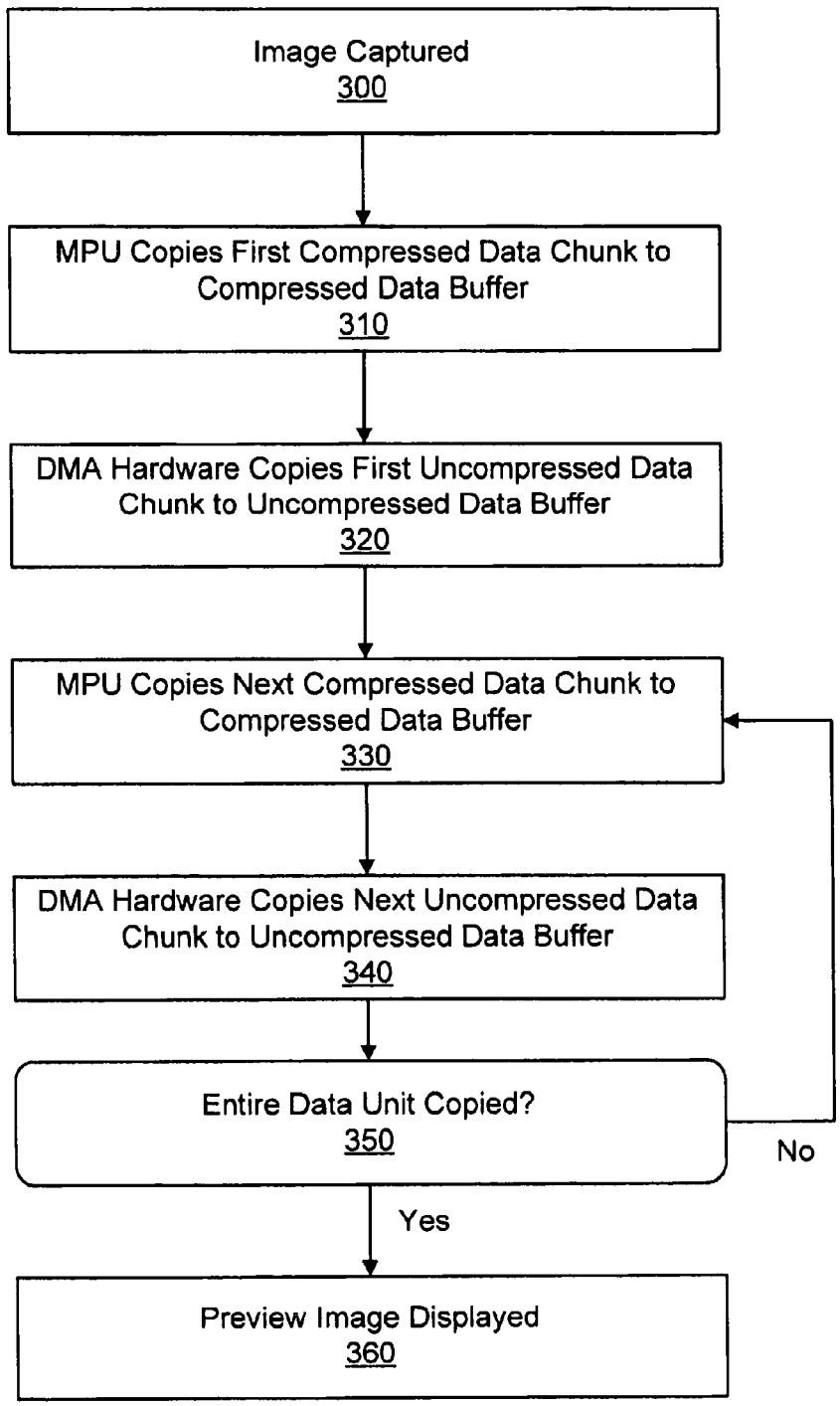
FIG. 6 is a flow chart showing the implementation of one embodiment of the present invention.

FIG. 6 is a flow chart showing the implementation of one embodiment of the present invention. Step 300 in FIG. 6 represents the starting point for the deinterleaving of a data unit. At this point, an image has been captured and the interleaved data buffer 200 contains the original interleaved data unit. The compressed data buffer 210 and the uncompressed data buffer 220 have been reserved for storing the compressed data and preview data in concatenated form, accordingly. Those DMA configurations that do not change in the course of the operation are also performed at this point.

At step 310 in FIG. 6, and assuming that the data unit begins with compressed data, the MPU 230 begins to examine the interleaved data unit from the beginning of the data unit. The MPU 230 searches for a marker that indicates where the next preview data chunk begins. While performing this action, the MPU 230 copies the compressed data to the compressed data buffer 210 up to, but not including, the marker that indicates the beginning of the preview data. It should be noted that, if the data unit begins with preview data, this step is skipped.

At step 320, the DMA hardware 240 is initialized to perform a memory-to-memory copy from the newly-found beginning of the preview data to the uncompressed data buffer 220. It should be noted that the markers are not included in this memory copy. The size of the DMA transfer is known, as it is the fixed size of the preview data chunk.

At step 330 and as the DMA hardware 240 is transferring data in the background, the MPU 230 skips the preview data chunk (as its size was known) and starts examining the data that follows the now-skipped preview chunk. In case the optional marker for compressed data is expected and found, or in case the optional marker is not used, but there is more data to process, the MPU 230 will continue to examine the data until a marker for preview data is found. While performing this action, the MPU 230 copies the compressed data to the compressed data buffer 210, placing it immediately after the data that was previously moved to the compressed data buffer 210.

At step 340, either one can assume that the DMA hardware 240 has finished copying the image data chunk that was being copied at step 320, or the system can specifically check the status of the DMA hardware 240 and can wait until the transfer is finished. In either of the above events, the DMA hardware 240 is reinitialized to perform a memory-to-memory copying for the next preview data chunk, copying the data to the uncompressed data buffer 220, placing it immediately after the data that was previously moved to the uncompressed data buffer 220.

It should be noted that because DMA hardware is in particular designed for moving data quickly, and since MPU has to additionally examine the data it is copying, the DMA hardware 240 should be able to process more data in the same time period than the MPU 230. In case there is a risk that the DMA transfer is not finished at the point where new a DMA transfer should be initiated, an alternative solution involves using two or more DMA channels so that consecutive DMA requests are always made for different channels.

At step 350, it is determined whether the entire data unit has been copied. If the entire data unit has been copied, then the preview image can be displayed at step 360, and the compressed data is saved in the compressed data buffer 210. If the entire data unit has not been copied, then steps 330 and 340 are repeated until the entire data unit has been processed and placed in the compressed data buffer 210 and the uncompressed data buffer 230, respectively.

As mentioned previously, the process depicted in FIG. 6 can also work in the situation where the compressed data buffer 210 is the same as the interleaved data buffer 200. It should be noted that, if the data unit is ordered as depicted in FIG. 2, the MPU 230 will begin overwriting the first preview data chunk at about at the same time as the DMA hardware 240 is transferring that data chunk to the uncompressed data buffer 220. In most cases, however, it can be safely assumed that the DMA hardware 240 operates faster than the MPU 230, as the DMA hardware 240 can blindly copy the data and does not have to spend any time analyzing it. Therefore, the DMA hardware 240 is able to read the preview data before it is overwritten by compressed data from the next chunk.

Because the size of the DMA transfer is always the same, initializing a new DMA transfer may only require two actions after the initial configuration is made. The first action is configuring the DMA read start address, while the second action is enabling the DMA transfer. This assumes that the DMA hardware 240 contains a write pointer that is automatically incremented while the transfer progresses. The write pointer therefore automatically points to the correct location in the uncompressed data buffer 220 when the next preview data chunk is copied.

In an alternative embodiment of the invention, there are data chunks of more than two different types. In this situation, the MPU 230 can handle all of the chunks whose size can vary, while the DMA hardware 240 continues to take care of all fixed size chunks. More than one DMA channel in the DMA hardware 240 can be used if there is more than one type of chunks with a fixed length. These multiple channels are used in order to ensure that there is no need to wait for the completion of one DMA transfer before the next transfer can begin, as each DMA channel can operate independent of other channels.

It should be noted that a wide variety of chunk markers may be used in conjunction with the present invention, and that the present invention is not limited to any specific type of marker. In addition, even though chunk markers have been used in the beginning of each chunk in the process depicted in FIG. 6, the markers could be also be used at the end of each chunk or both at the beginning and at the end of each chunk.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   copying an uncompressed data chunk from an interleaved data unit to an uncompressed data buffer, the interleaved data unit comprising a plurality of alternating uncompressed data chunks and compressed data chunks;
   searching a compressed data chunk from the interleaved data unit after a predetermined data length to find a marker while the uncompressed data is being copied, the marker indicating a beginning of the next uncompressed data chunk; and
   copying a compressed data chunk of the interleaved data unit to a compressed memory buffer until the marker is reached.

2. The method of claim 1, wherein the compressed data does not include the marker that indicates where the uncompressed data chunk begins.

3. The method of claim 1 further comprising when the marker is found, copying the next uncompressed data chunk from the interleaved data unit to the uncompressed data buffer.

4. The method of claim 1 wherein the next compressed data is copied to the uncompressed data buffer while the compressed data chunk is being copied to the compressed data buffer.

5. An apparatus comprising:
   a direct memory access unit;
   a microprocessor unit coupled to the direct memory unit;
   an uncompressed memory unit coupled to the microprocessor unit and to the direct memory unit;
   a compressed memory unit coupled to the microprocessor unit and to the direct memory unit;
   the direct memory access unit configured to:
   copy an uncompressed data chunk from an interleaved data unit to the uncompressed memory unit, the interleaved data unit comprising a plurality of alternating uncompressed data chunks and compressed data chunks; and
   the microprocessor unit configured to:
   search for a marker in the interleaved data unit after a predetermined data length while the uncompressed data is being copied, wherein the marker indicates a beginning of the next uncompressed data chunk; and
   copy a compressed data chunk of the interleaved data unit to the compressed memory unit until the marker is reached.

6. The apparatus of claim 5, wherein the compressed data chunk does not include the marker that indicates where the uncompressed data chunk begins.

7. The apparatus of claim 5, wherein the direct memory access unit is further configured to, when the marker is found, copy the next uncompressed data chunk from the interleaved data unit to the uncompressed memory unit.

8. The apparatus of claim 5 wherein the next compressed data is copied to the uncompressed data buffer while the compressed data chunk is being copied to the compressed memory unit.

9. A non-transitory computer readable medium embodied with instructions for processing an interleaved data, the non-transitory computer readable medium comprising:
   computer code for copying an uncompressed data chunk from an interleaved data unit to an uncompressed data buffer, the interleaved data unit comprising a plurality of alternating uncompressed data chunks and compressed data chunks;
   computer code for searching for a marker in the interleaved data unit after a predetermined data length while the uncompressed data is being copied, wherein the marker indicates a preview beginning of the next uncompressed data chunk; and
   computer code for copying a compressed data chunk of the interleaved data unit to a compressed data buffer until the marker is reached.

10. The non-transitory computer readable medium of claim 9, wherein the compressed data chunk does not include the marker that indicates where the uncompressed data chunk begins.

11. The non-transitory computer readable medium of claim 9 further comprising computer code for when the marker is found, copying the next uncompressed data chunk from the interleaved data unit to the uncompressed data buffer.

12. The non-transitory computer readable medium of claim 9 wherein the next compressed data is copied to the uncompressed data buffer while the compressed data chunk is being copied to the compressed data buffer.

* * * * *